April 11, 1944.   F. O. HOAGLAND   2,346,581
RIFLING CUTTER
Filed May 5, 1942
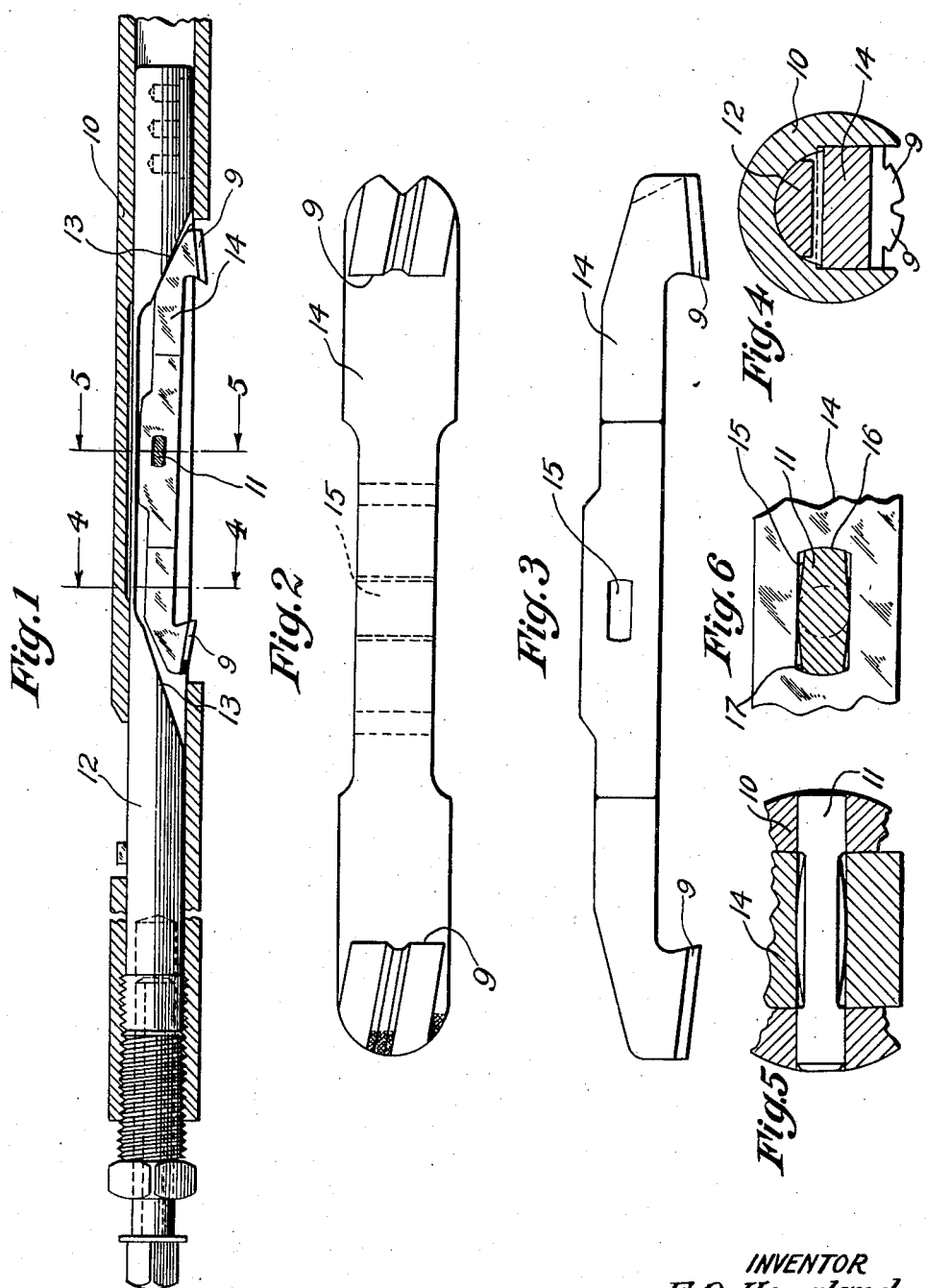
INVENTOR
F. O. Hoagland
BY
ATTORNEY Patented Apr. 11, 1944

2,346,581

UNITED STATES PATENT OFFICE 2,346,581

RIFLING CUTTER

Frank O. Hoagland, West Hartford, Conn., assignor to Niles-Bement-Pond Company, West Hartford, Conn., a corporation of New Jersey Application May 5, 1942, Serial No. 441,829

4 Claims. (Cl. 90—28.1)

This invention relates to rifling cutters and particularly to a double ended cutter for use in a rifling head for a standard form of gun barrel rifling machine.

An object of the present invention is to provide an improved form of rifling cutter having cutting surfaces at its opposite ends disposed in opposed relation to each other, the cutter being pivotally mounted so that the cutting surfaces at its opposite ends may effect a cutting operation in each direction of reciprocation of the head through the gun bore being rifled.

Another object of the invention is to provide a pivotal support for the cutter preferably disposed centrally of the cutter, there being arcuate surfaces at the ends of an elongated central transverse opening in the cutter for engagement with a transverse pin fixed in the head and formed to engage these arcuate surfaces and permitting limited pivotal movement of the cutter.

With the above and other objects in view the invention includes the features of construction and operation set forth in the following specification and illustrated in the accompanying drawing.

In the accompanying drawing annexed hereto and forming a part of this specification, I have shown the invention embodied in a rifling head similar to that disclosed and claimed in my copending application Serial No. 390,582, filed April 26, 1941, now Patent No. 2,230,584, granted September 28, 1943, and entitled "Tool head for rifling machine." It will be understood, however, that the invention can be otherwise embodied and that the drawing is not to be construed as defining or limiting the scope of the invention, the claims appended to this specification being relied upon for that purpose.

In the drawing:

Figure 1 is a central longitudinal sectional view of a rifling tool head showing the cutter forming the subject matter of the present invention in position therein.

Fig. 2 is an inverted plan view of the cutter shown in Fig. 1 upon an enlarged scale.

Fig. 3 is a side elevation of the tool corresponding to that shown in Fig. 2.

Figs. 4 and 5 are cross sectional views of the cutter and head taken on the planes of lines 4—4 and 5—5 respectively and on enlarged scales; and Fig. 6 is an enlarged side elevation of the cutter adjacent its pivotal opening showing the relation of the pin to the walls of the opening supporting the cutter and permitting it to oscillate.

In the above-mentioned drawing there has been shown but one embodiment of the invention which is now deemed preferable, but it is to be understood that changes and modifications may be made within the scope of the appended claims without departing from the spirit of the invention.

It has heretofore been the practice to form the rifling grooves within the bore of a gun barrel by reciprocating a rifling tool therethrough and adjusting its cutting edge or edges so that it will successively cut deeper into the rifling grooves after each complete indexing of the barrel. In cutters as heretofore made the cutting action has been restricted to movement of the tool through the gun barrel in one direction only and it is a primary object of the present invention to permit the strokes of the tool through the gun barrel in each direction to perform a cutting operation. The present cutter is similar to that shown in my above referred to copending application and was particularly developed for the tool head claimed therein.

Referring more in detail to the figures of the drawing, there is shown a rifling tool head having a sleeve 10 and a transverse pin 11 extending therethrough presently to be more fully described. Slidably disposed within the rifling sleeve 10 is a member 12 having oblique surfaces 13 forming the terminal surfaces of a recessed portion similar to the corresponding member in the above-mentioned copending application. Supported centrally upon the transverse pin 11 is the cutter 14 forming the subject matter of the present invention. At opposite ends of the cutter 14 are cutting surfaces 9 obliquely disposed and facing in opposite directions. This cutter 14 in its preferred embodiment, as shown, has a central transverse opening 15 suitably elongated and having arcuate surfaces 16 at its opposite ends. The upper and lower surfaces of this opening are flat and parallel to each other and the end walls form the mid portions of a cylinder having a diameter equal to the length of the opening. The pin 11 upon which the cutter 14 is supported is suitably elongated to fit the opening and has arcuate or cylindrical surfaces at its opposite ends contacting the end walls of the cutter opening 16. The pin 11 has its upper and lower or side surfaces 17 suitably tapered from its central toward its end portions, the central portion of the pin having the greatest thickness and corresponding to the width of the opening in the cutter. By means of this pin 11 the cutter 14 is supported against vertical displacement by the central portion of the pin but is adapted to have limited pivotal movement by the tapered end portions of the pin. The oppositely disposed cylindrical surfaces forming the end surfaces of the pin and cutter support the cutter 14 axially against cutting pressures in both directions of reciprocation. The form of the pin 11, therefore, is adapted primarily for resisting this pressure as well as supporting the cutter 14 in proper position. Also the central portion of the pin 11 may be transversely crowned slightly to permit adjustment as indicated in Fig. 5.

In my copending application the operation of the slidable member 12 within the sleeve 10 to alternately support the cutter 14 in operative position for cutting in each direction has been described so that further description of this member and its adjustable limits of movement will not be necessary. It will suffice to state that with each reversal of movement of the rifling head the slidable member 12 is forced to its opposite axial position which causes the cutter 14 to pivot about its central supporting pin 11. The cutting surfaces at one end of the cutter will therefore be advanced to operative position to cut the rifling grooves in each direction of movement of the rifling head.

It will be noted that in Fig. 3 the front cutting surfaces 9 at the opposite ends of the cutter 14 are disposed obliquely relative to the length of the cutter but are in alinement axially of the cutter as disposed in the cutting head. Also the cutting teeth extend obliquely in conformity with and their oblique angle corresponds to the lead of the rifling. It has been explained in my copending application that the cutting surfaces at one end of the cutter when moving in one direction will cut into one of the rifling grooves while movement of the cutter in the opposite direction will enter an adjacent groove. As the grooves in the bore of the gun barrel are disposed uniformly about the periphery of the bore, the relative disposition of the cutting surfaces at the opposite ends and their oblique angle are critical and are made to conform to the requirements of the particular gun barrel being rifled.

I claim:

1. A cutter for rifling tool heads having cutting surfaces at its opposite ends disposed obliquely and in opposed relation to each other for cutting in opposite directions of movement of said tool, said cutter having a central elongated opening extending transversely therethrough, said opening having opposed arcuate end surfaces forming means permitting limited pivotal movements of said tool within a rifling head in opposite directions.

2. A cutter for rifling tool heads having cutting surfaces at its opposite ends disposed in opposed relation to each other for cutting in opposite directions of movement of said tool, said cutter having a central elongated opening extending transversely therethrough, said opening having opposed arcuate end surfaces and plane parallel top and bottom surfaces forming means for positioning said tool within a rifling head and perhead for liimted pivotal movement therein.

3. A cutter for rifling tool heads having obliquely positioned cutting surfaces at its opposite ends disposed in opposed relation to each other for cutting in opposite directions of movement of said tool, said cutter having a central elongated opening extending transversely therethrough having plane parallel top and bottom surfaces and opposed arcuate end surfaces for mounting said tool in position within a rifling head for liimted pivotal movement therein.

4. A cutter for rifling tool heads having cutting surfaces at its opposite ends disposed in opposed relation to each other for cutting in opposite directions of movement of said tool, said cutter having an central elongated opening extending transversely through said tool, said opening having top and bottom surfaces for supporting said cutter against vertical displacement and having opposed arcuate end surfaces the diameter of curvature of which corresponds to the length of the opening, said arcuate surfaces forming means upon which said tool may be pivoted through a limited distance within the rifling head.

FRANK O. HOAGLAND.

CERTIFICATE OF CORRECTION.

Patent No. 2,346,581.　　　　　　　　　　　　　　April 11, 1944.

FRANK O. HOAGLAND.

It is hereby certified that error appears in the printed specification of the above numbered patent requiring correction as follows: Page 2, second column, lines 20 and 21, claim 2, for "per- head for liimted" read --permitting limited--; line 31, claim 3, for "liimted" read --limited--; and that the said Letters Patent should be read with this correction therein that the same may conform to the record of the case in the Patent Office.

Signed and sealed this 30th day of May, A. D. 1944.

Leslie Frazer

(Seal)　　　　　　　　　　　　　　Acting Commissioner of Patents.